United States Patent [19]
Kimbell et al.

[11] Patent Number: 5,156,334
[45] Date of Patent: Oct. 20, 1992

[54] GAS PERMEATION SYSTEM

[76] Inventors: Charles L. Kimbell, 3018 Manila, Houston, Tex. 77043; Lemuel H. Barclay, 10034 Clay Rd., Houston, Tex. 77080

[21] Appl. No.: 567,736

[22] Filed: Aug. 15, 1990

[51] Int. Cl.$^5$ ............................ B05B 17/00; B01F 3/00
[52] U.S. Cl. ........................................... 239/6; 239/34; 239/44; 261/99
[58] Field of Search ............... 239/34, 44, 49, 6; 422/62, 83, 101; 73/864.81; 261/99, 104; 206/0.5

[56] References Cited

U.S. PATENT DOCUMENTS

| | | | |
|---|---|---|---|
| 3,521,865 | 7/1970 | Kertzman | 261/99 |
| 3,618,911 | 11/1971 | Martin | 261/104 |
| 3,788,545 | 1/1974 | Budd et al. | 239/34 |
| 3,856,204 | 12/1974 | Chand | 239/34 |
| 4,399,942 | 8/1983 | Chand | 239/34 |

Primary Examiner—Andres Kashnikow
Assistant Examiner—Karen B. Merritt

[57] ABSTRACT

A trace component dispensing system where a permeand in a container is exposed to an elongated permeation member in the container where the permeation member has a bore sized to control the rate of permeate flow. For low pressure application a tubing is inserted into the bore to pass carrier gas across the surface of the bore and to intermix with permeate. Fluids can be input to the container to block impurities from the permeate gas. The effective surface area can be controlled to control the rate of permeate flow.

17 Claims, 2 Drawing Sheets

GAS PERMEATION SYSTEM

FIELD OF THE INVENTION

This invention relates to methods and apparatus for constructing and utilizing a fluid dispensing device, and more particularly, to fluid devices for generating extremely small flow rates for use as a trace component for calibration or measurement purposes.

BACKGROUND OF THE INVENTION

Liquid as well as gas permeation devices are utilized to generate extremely small flow rates by permeating a volatile fluid which is transmitted in a permeation process by a permeand passing through a permeation barrier and becoming a permeate upon leaving the barrier. Various permeation materials include fluoroplastic, acetal, silicone, rubber, neoprene, viton, and polypropylene. Permeands include benzene, alcohol, water, toluene, hydrogen sulfide methane and so forth.

Heretofore, obtaining controlled rates of flow from a permeation barrier for trace fluids has been difficult to obtain and control, and in the present invention, control of permeation is obtained precisely.

Also, sometime there has been no practical way for analyzing samples of process gases which have impurities. In the present invention, process streams with impurities can be cleaned up.

The present invention provides a structure that is suitable at temperatures near ambient for permeands that are liquid at ambient temperature and pressure.

A further aspect of the present invention is a system for injecting gas such as hydrogen sulfide in small rates of flow into a process stream.

Prior patent art known to Applicant include 3,788,545; 3,856,204; and 4,399,942.

SUMMARY OF THE PRESENT INVENTION

In the present invention the permeation member is an elongated member disposed within an elongated container containing a permeand where the permeation member has a sized blind bore extending along the length of the permeation member, it being recognized that a tubular permeation member will provide many of the same benefits and is an alternate configuration. The permeation member being within the container, may be under compression, as opposed to tension, to reduce stress cracking of the permeation member and increases resistance to rupture resulting from the pressure of the permeand.

The elongated blind bore has a long length and a small diameter so that a fringe effect due to diagonal travel of the permeand is diminished relative to the total permeation area. This provides a more predicable output rate from a given configuration. The output rate can be easily changed, even after the container is filled with permeand, by drilling a blind bore deeper or by increasing the diameter of the blind bore.

If the barrier is allowed to contact gases such as moisture, this can cause a change in permeation rate. This is prevented by a metal filler rod sized smaller than the blind bore which is inserted into the blind bore to reduce the exit and the internal volume opening. An annular space of less than 0.001 inch can be obtained, minimizing back diffusion. The filler rod is preferably curved to provide for frictional retention in the blind bore.

In another aspect of the present invention, if the liquid vapor in the container is below atmospheric pressure, there is insufficient pressure to produce a vapor flow of permeate. This is overcome by forcing a carrier fluid through a dip tube to a location near the bottom of the blind bore so that carrier fluid is forced into the annulus between the dip tube and the blind bore so as to reduce the partial pressure of the permeate sufficiently to allow permeate flow. A flow through arrangement can also cause the same result as use of a dip tube.

In another aspect of the present invention, a housing means contains a permeand and a permeation member inside the housing means where the permeation member is used for regulating permeand flow. A fixed volume container is used for establishing volume of carrier fluid. The duration of time the permeable flow is allowed to enter the fixed volume determines the concentration in the fixed volume. Permeand flow can be set to make one part per million mixture for each second of flow into the fixed volume.

In still another aspect of the present invention, a permeand in a gaseous state can be utilized. For example, nitrogen or carbon monoxide in a gas state can be fed into and out of the container and provide a gas under pressure within the container. The permeate output from the permeation member can be controlled by regulating the pressure of the input gas. If the permeand gas is not pure, it is necessary to have an output flow of permeand to sweep out impurities.

In analyzing trace gas in a process stream, the particulates, mists, free liquids and other components can be restricted by a permeation barrier while the permeate is transferred into a clean carrier gas. The analyzer is protected by the permeation member from undesirable components. In the case of hydrogen sulfide in fuel gas, the reduction in concentration of the hydrogen sulfide by the carrier gas is of considerable benefit, as some analyzers operate best at low concentrations.

DESCRIPTION OF THE PRESENT INVENTION

Figure 1:
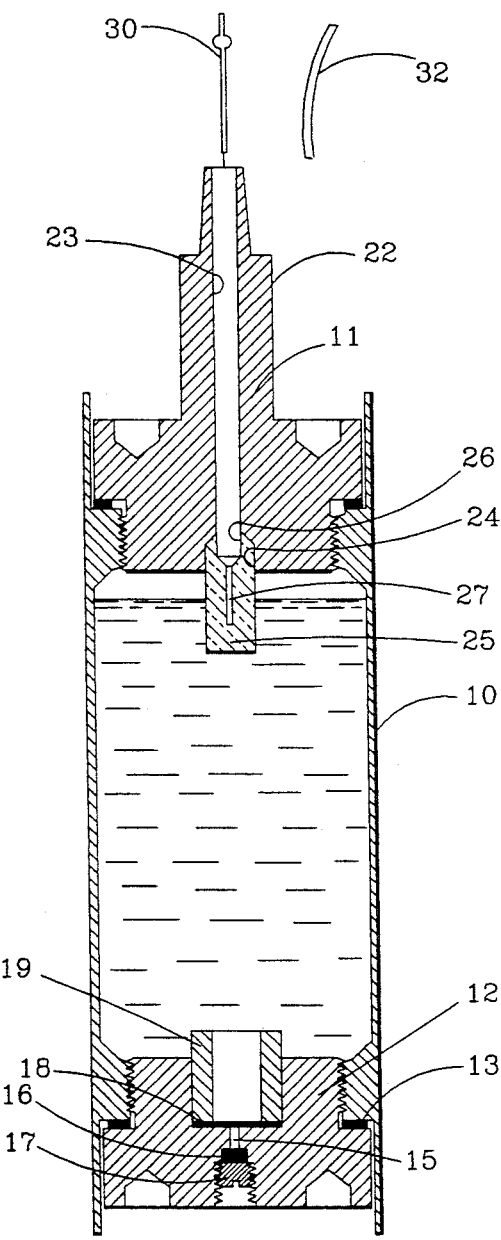
FIG. 1 illustrates in longitudinal cross section a container arrangement for obtaining controlled rates of flow.

Referring now to FIG. 1, the permeand container of the present invention includes a tubular housing member 10 made of aluminum which is internally threaded at both ends to receive aluminum end caps 11,12. By way of illustration, the housing member 10 can have an outer diameter of 1 inch, a wall thickness of 1/16 inch and a length of 6 inches to provide a container volume of 2.6 cubic inches. In the lower end is the cap member 12 that has a flange which cooperates with a fluorocarbon seal member 13 and the housing member 10 to provide a compression gas tight seal. The cap member 12 is tightly fitted into the counterbore in the housing member. A central port 15 through the end cap 12 has an enlarged threaded bore section to receive an inlet seal plug 16 constructed from fluorocarbon and an inlet set screw or closure member 17. The port 15 has a second enlarged bore section to receive an elastomer sealing disc 18 and a tubular bushing clamp 19. The interior of the cylinder case 10 can be filled with a liquified gas such as sulfur dioxide, where this trace gas is desired, by hypodermic injection through the sealing disc 18.

At the upper end of the housing member 10 is the cap member 11, which is tightly received in a counterbore and which cooperates with a fluorocarbon seal to provide a gas tight seal. The cap member 11 has an extending tubular outlet section 22 which has an exterior configuration for attachment to a tee coupling in a main gas line. The outlet section 22 has an elongated central bore 23 which joins an enlarged counterbore 24 in the cap member 11. The enlarged counterbore 24 receives a cylindrically shaped elongated permeation member 25 constructed of a permeable material. The permeation member has an upper bore portion 26, sized to receive a seal pin, which continues the bore 23 of the outlet section and has a lower bore portion 27 with reduced diameter which receives permeate. The lower bore portion 27 is a blind bore which extends lengthwise of the permeation member 25 from a location near the interior end surface of the end cap 11.

The permeation member 25 may be constructed from one of various polymeric materials chosen for the permeation rate desired and for chemical inertness to the permeand and for minimum change in rate with temperature. The permeation member 25 serves to provide a controlled permeation of the permeand in the housing member to a permeate in the bore 27 and the permeate is utilized for introduction as a trace fluid in another liquid or stream of gas. In the permeation member 25, the length of the bore 27, its cross sectional area, the pressure within the housing 10, the pressure within the bore and the material of the permeation member 25 affect the permeation rate. The length of the bore 27 between the end of the end cap 11 and the end of the blind bore 27 is herein defined as the permeation zone. The permeation zone has a length and diameter which determines a permeation rate or output flow rate. The length of the permeation zone and its diameter are grossly determined with respect to a permeation member and a permeand by empirical methods. The permeation member 25 may, for example, extend into the container for a length of 2 inches with a bore diameter of 0.082 inches for chlorene as a permeand and FEP fluorocarbon as the material for the permeation member 25.

The bore 26 can be sealed for shipment or for storage by using a stainless steel wire element 30 which is sized to plug off the bore 26. The wire element 30 is subsequently removable by cooling the housing sufficiently to reduce the internal pressure below the pressure which would fracture the permeation member prior to removing the wire element 30.

To minimize diffusion of carrier gas from a main gas line into the bore 27, which could effect permeation rate, a longitudinally curved stainless steel filler rod 32 is insertable into the bore 23. The diameter of the rod 32 is less than the diameter of the bore 23 and serves to restrict the size of the bore 23 and provide an annulus output path so that the permeate in the annulus has sufficient flow to prevent back diffusion of the carrier gas into the bore 27. Pulsations caused by carrier pressure changes are minimized.

Figure 4:
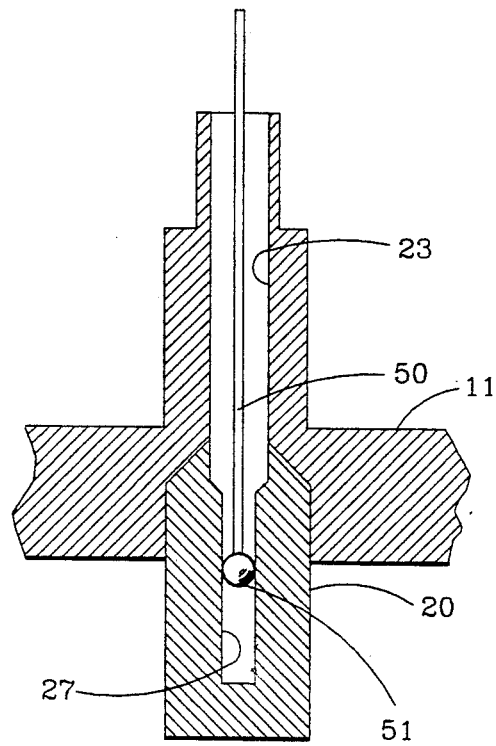
FIG. 4 illustrates an alternate flow control device.

As described above, the bore 27 in the permeation member 25 is sized and drilled and then tested to determine the permeation rate for a given permeation material and permeand. If the output permeation rate is insufficient for the surface area of the bore diameter and length, a deeper or longer bore 27 can be drilled, even after filling the housing with a permeand. Alternatively, the bore 27 can be redrilled to a larger diameter to increase the surface area. The filler rod 32 can reduce the annular space to less than 0.001 inch which also allows the permeate to flush out the exit bore 23 in use. In the even that the permeation rate for a given bore length and bore diameter is too great or greater than desired, the flow rate can be decreased by inserting a solid ball into the bore to decrease the effective surface area for permeating. As shown in FIG. 4, a rod 50 with an attached ball member 51 can be utilized as a control for the permeation rate and a desired permeation rate is obtained by adjustment of the ball position in the bore 27. The rod 50 also serves as a back diffusion limiting means.

Figure 2:
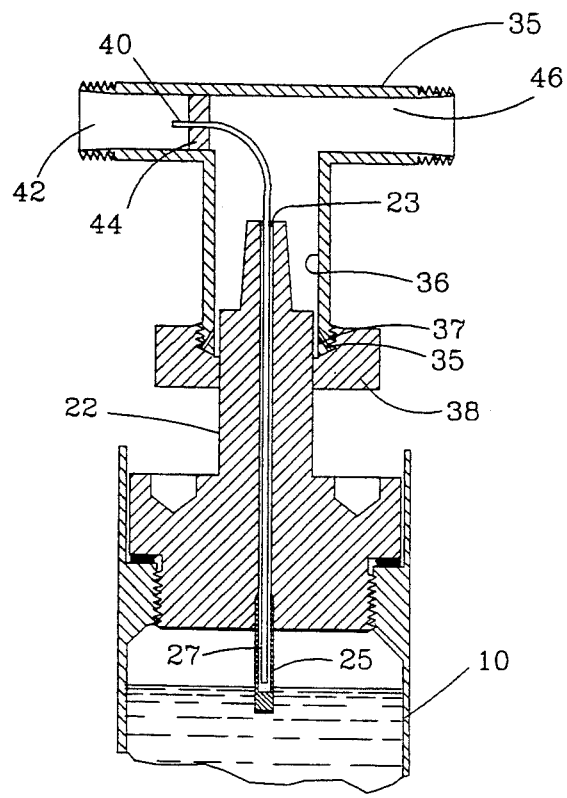
FIG. 2 illustrates in longitudinal cross section an arrangement for introducing fluid such as water vapor into a carrier fluid even though water has a low vapor pressure.

Referring now to FIG. 2, another form of invention is illustrated. In FIG. 2, the outlet section 22 of a permeand filled housing or container 10 is coupled to the input of a T coupling 35. The T coupling 35 has a tapered input bore 36 which receives a seal gland 37 and the output end of the outlet section 22. A coupling nut 38 sealingly connects the outlet section 22 in the bore 36. A dip tube 40 is inserted into the bore 23,27 of the outlet section 22 so that carrier fluid flow from inlet 42 is directed into the dip tube 40, the open end of the dip tube 40 being sealed off in the inlet 42 by a seal gland 44. Carrier fluid flow in the dip tube 40 is carried to a location near the bottom of the bore 27 in the permeation member and passes upwardly through the annulus between the dip tube 40 and the bore 23,27 in the permeation member to the output passage 46 of the T coupling. This method sweeps out permeate reducing its partial pressure in bore 27 to almost zero and insures a driving force equal to the full vapor pressure of the permeand to increase the pressure differential across the wall of the permeation member 25.

In apparatus as shown in FIG. 2 and as described hereafter in FIG. 3, it is sometimes desirable to develop a permeate in the bore which has a partial pressure below atmospheric pressure. In such instance condensation can occur, however, by use of the carrier fluid as a sweeping agent across the surface area of the bore, the partial pressure of the permeate in the bore can be reduced to essentially zero so that the differential pressure across the wall of the permeation member is optimized. Without the dip tube sweep, liquid having vapor pressure below atmospheric would cease to permeate when vapor pressure on both sides of the barrier, reaches equalibrium.

Figure 3:
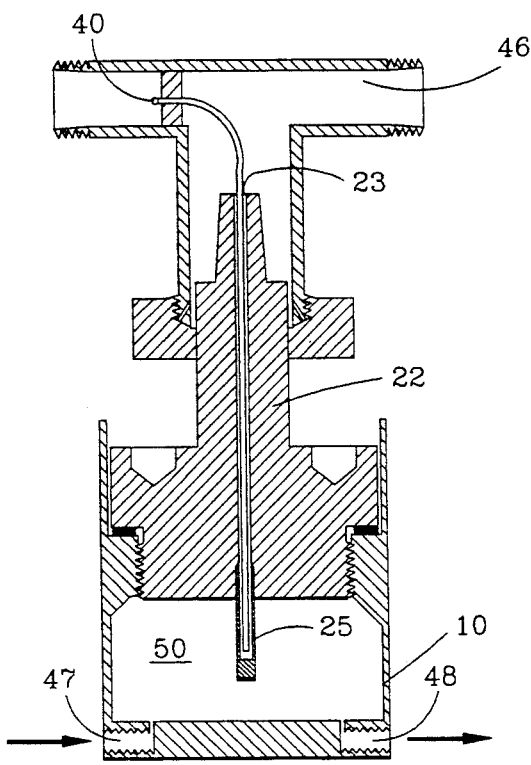
FIG. 3 illustrates in longitudinal cross section, an arrangement for obtaining controlled rates of flow for gases which can not easily be liquified, or to eliminate impurities when analyzing a sample or to isolate an analyzer from the main sample stream.

Referring now to FIG. 3, in this embodiment of the present invention, the T coupling and dip tube arrangement are the same as described with respect to FIG. 2. However, the housing 10 is provided with an input opening 47 which is connected to a source of permeand. The output opening 48 allows venting to remove impurities that could concentrate and alter rate of flow. Gases such as carbon monoxide, nitrogen and the like are not easily liquified. However, with the present invention, a gas such as nitrogen can be throughput through the chamber 50; in gas form and not require liquification. In this case, the driving force or pressure on the permeation member 25 is the pressure of the permeand gas within the chamber 50 in the housing 10. The gaseous permeate output in the bore 23,27 is controlled by controlling the pressure of the permeand gas in the chamber 50. If the permeand gas is pure it is not necessary to have an output flow of permeand gas from the chamber 50.

In another aspect of the present invention illustrated in FIG. 3, some constituents in a process stream are undesirable when the process stream is subjected to analysis. The structure shown in FIG. 3 can be utilized to filter out impurities by passing the process stream through the chamber 50 while passing clean carrier gas through the dip tube 40. In this manner the impurities are effectively blocked by the permeation member while the permeate is transferred into a clean carrier gas in the output passage 46. In the case of hydrogen sulfide, a reduction in concentration of the hydrogen sulfide in the carrier gas results when high flow rates of carrier gas are used and is a considerable benefit because some analyzers operate best at low hydrogen sulfide concentration.

Figure 5:
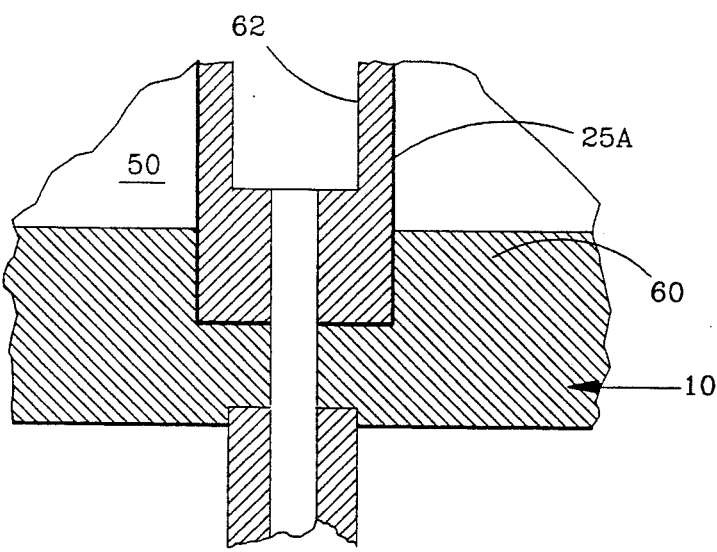
FIG. 5 illustrates an alternate form of the invention.

An alternate form of the invention is shown in FIG. 5 where the permeation member 25a extends into a bore in the bottom wall 60 of the housing 10. Gases or permeand in the housing chamber 50 permeate through the permeation member 25a while carrier fluid is passed through the bore 62 of the permeation member.

Figure 6:
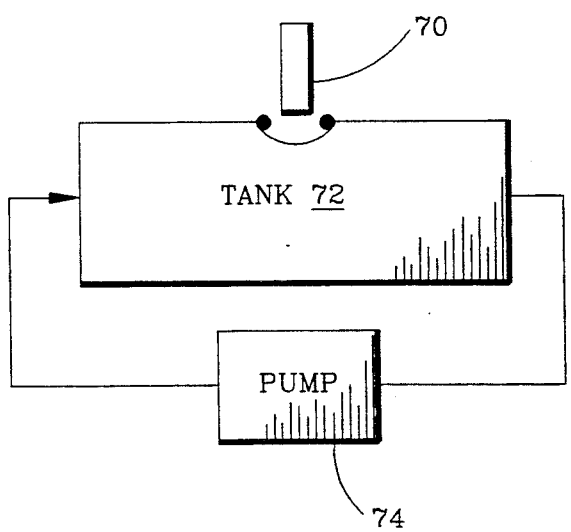
FIG. 6 illustrates an application of the present invention.

In FIG. 6, an application of the present invention is illustrated where a dispenser 70 with a predetermined permeate volumetric output per unit of time is connectable to a fixed volume tank 72 which contains a liquid or gas to receive a fixed or predetermined amount of permeate from the dispenser. In contra distinction to prior systems, the dispenser is connected to the tank for a fixed period of time which determines the concentration. For example, if the dispenser disperses 41,790 nanograms/minute of H$_2$S into a fixed volume of 500 milliliters the concentration within the container will increase by 1 part per million (PPM) per second. Thus, in 10 seconds of time, the concentration produced is 10 PPM by volume. The equation is:

$$n = (x)(y)(83.58) \quad (1)$$

where x is container volume in milliliters;
y is parts per million per second desired; and
n is nanograms per minute needed.

As shown in FIG. 6, the mixing of the concentration can be enhanced by use of a pump 74 to circulate the mixture during injection.

It will be apparent to those skilled in the art that various changes may be made in the invention without departing from the spirit and scope thereof and therefore the invention is not limited by that which is disclosed in the drawings and specifications but only as indicated in the appended claims.

We claim:

1. A dispenser containing a fluid for generating a flow for input to a carrier fluid, said dispenser including:
   a hollow elongated housing;
   a fluid permeand in said housing; and
   an elongated permeation element disposed in said housing, said permeation element having a longitudinally extending bore in a defined length segment, said length segment having a wall portion, a bore diameter and a bore length sized to regulate the permeation of said fluid permeand in said housing to a desired rate of permeate flow in said bore, said permeation element being compatible with the fluid permeand for permeation from the fluid permeand in the housing to the permeate in said bore, and
   diffusion regulating means for limiting back diffusion into said bore.

2. The dispenser as set forth in claim 1 wherein said diffusion regulating means is insertable in the bore to limit back diffusion of the carrier fluid into said bore and for minimizing contact of the carrier fluid with the bore.

3. The dispenser as set forth in claim 2 wherein said diffusion regulating means includes an elongated rod member.

4. The dispenser as set forth in claim 1 wherein said bore is a blind bore.

5. The dispenser as set forth in claim 4 and further including a carrier fluid line for transporting carrier fluid, said fluid line having an input connection coupled by tubing means to a location near the bottom of said blind bore where said tubing means extends into said blind bore so as to provide a path for carrier fluid and permeate to exit allowing carrier fluid to sweep past the bore wall to remove permeate.

6. The dispenser as set forth in claim 5 and further including inlet means to said housing for input of a permeand.

7. The dispenser as set forth in claim 6 and further including outlet means on said housing for passing permeand through said housing.

8. The dispenser as set forth in claim 1 wherein the bore of said permeation element can be closed off by an elongated metal sealing pin.

9. The dispenser as set forth in claim 1 wherein said permeation element extends over the length of said housing and said bore coupled to an output opening in said housing so that a carrier fluid may be processed through said bore.

10. A system for introducing permeate into a flowing fluid stream comprising
    housing means for containing a permeand, permeation means disposed in said housing means for developing a permeate output including an elongated outlet member having a central bore, said outlet member being disposed in the interior of said housing means at a location where said permeand is in contact with said outlet member; and including
    a coupling having an input and output passage and a mixing passage, said outlet member having its bore coupled to said output passage, tube means for coupling said input passage to a location in the bore of said outlet member near the bottom of said bore for mixing a flowing fluid with permeate from the outlet member.

11. A method of manufacturing a trace fluid dispenser for dispensing a trace fluid from a permeand in a housing through an elongated permeable member disposed in the housing to a bore in said permeable member comprising the steps of:
    filling a housing with a fluid permeand where said permeand is transmittable through said permeable member to develop a permeate in said bore;

sizing the length and bore diameter of said bore for generating a desired rate of permeate discharge from said bore; and fine tuning the rate of permeation discharge from said bore by changing the surface area of said bore after testing the output permeation rate to adjust the output permeation rate to a desired flow rate.

12. The method as set forth in claim 11 wherein said surface area is increased by drilling the bore to increase its length.

13. The method as set forth in claim 11 wherein said surface area is increased by increasing the diameter of said bore.

14. A method of controlling the flow rate from a trace fluid dispenser which disperses a trace fluid from a permeand in a housing through an elongated permeable member disposed in the housing to a bore in said permeable member comprising the steps of:

filling a housing with a fluid permeand where said permeand is transmittable through said permeable member to develop a permeate in said bore;

sizing the length and bore diameter of said bore for generating a desired rate of permeate discharge from an effective surface area in said bore; and inserting an impermeable obstruction member into said bore to change the effective surface area of permeation.

15. The method as set forth in claim 14 and further including the step of adjusting the position of said obstruction member in said bore for fine tuning the flow rate from said dispenser.

16. A method of dispensing permeand from a housing comprising the steps of:

producing a permeate in a bore of a permeable member disposed in a housing containing a liquid permeand where the permeate is derived from the liquid permeand in said housing and the permeate has a partial pressure below atmospheric pressure; and passing a carrier fluid through said bore with sufficient flow rate to reduce the partial pressure of the permeate in said bore to an insignificant partial pressure such that the pressure differential across the wall of the permeable member is optimized.

17. The method as set forth in claim 16 wherein the bore is a blind bore and the carrier fluid is passed to the bottom portion of the bore by a tubing to pass along the annulus between the bore and the tubing.

* * * * *